US009313076B2

(12) United States Patent
Kuo

(10) Patent No.: US 9,313,076 B2
(45) Date of Patent: Apr. 12, 2016

(54) ANTENNA MODULATION METHOD APPLICABLE TO WIRELESS TRANSMITTER AND TRANSMITTER USING THE SAME

(71) Applicant: Industrial Technology Research Institute, Hsinchu (TW)

(72) Inventor: Ping-Heng Kuo, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/320,665

(22) Filed: Jul. 1, 2014

(65) Prior Publication Data

US 2015/0016569 A1    Jan. 15, 2015

Related U.S. Application Data

(60) Provisional application No. 61/844,949, filed on Jul. 11, 2013.

(51) Int. Cl.
H04L 27/36 (2006.01)
H04L 27/20 (2006.01)
H04B 7/04 (2006.01)
H04B 7/06 (2006.01)

(52) U.S. Cl.
CPC ............... *H04L 27/36* (2013.01); *H04L 27/20* (2013.01); *H04L 27/362* (2013.01); *H04B 7/0413* (2013.01); *H04B 7/0691* (2013.01)

(58) Field of Classification Search
USPC ................. 375/264, 267; 455/67.11
See application file for complete search history.

(56) References Cited

U.S. PATENT DOCUMENTS

2006/0193396 A1  8/2006  Li
2008/0037673 A1  2/2008  Ahn et al.
2014/0056383 A1  2/2014  Kuo et al.

OTHER PUBLICATIONS

Meshleh et al., Spatial Modulation, Jul. 2008, IEEE.*
Raed Y. Meshley, Spatial Modulation, Jul. 2008, IEEE Transaction on Vehicular Technology, 57, No. 4.*
Mesleh, R. et al., "Spatial Modulation—A New Low Complexity Spectral Efficiency Enhancing Technique", Communications and Networking in China, 2006. ChinaCom '06. First International Conference on, 2006, Oct. 2006, p. 1-p. 5.
Younis, A. et al., "Generalised spatial modulation", 2010 44th Asilomar Conference on Signals, Systems and Computers, 2010, Nov. 2010, p. 1-p. 5.
Rusek et al., "Scaling Up MIMO," IEEE Signal Processing Magazine, Jan. 2013, pp. 40-60.
Di Renzo et al., "Bit Error Probability of SM-MIMO Over Generalized Fading Channels," IEEE Transactions on Vehicular Technology, Mar. 2012, pp. 1124-1144.

(Continued)

*Primary Examiner* — Chieh M Fan
*Assistant Examiner* — Wednel Cadeau
(74) *Attorney, Agent, or Firm* — Jianq Chyun IP Office

(57) ABSTRACT

An antenna modulation method applicable to a transmitter comprising a processing unit which is configured to execute functions including at least but not limited to receiving a symbol represented by a bit stream; converting the bit stream into a coordinate point of a signal constellation comprising a horizontal-axis component and a vertical-axis component; converting, from the horizontal-axis component of the coordinate point, a first vector having at least a first entry and a second entry; converting, from the vertical-axis component of the coordinate point, a second vector having at least a third entry and a fourth entry; generating a third vector having at least a fifth entry and a sixth entry by summing the first vector and the second vector; and activating at least one of the first antenna and the second antennas based on one or more non-zero entries of the third vector.

20 Claims, 5 Drawing Sheets

(56) References Cited

OTHER PUBLICATIONS

Mesleh et al., "Spatial Modulation," IEEE Transactions on Vehicular Technology, Jul. 2008, pp. 2228-2241.

Jeganathan et al., "Space Shift Keying Modulation for MIMO Channels," IEEE Transactions on Wireless Communications, Jul. 2009, pp. 3692-3703.

Jeganathan et al., "Generalized Space Shift Keying Modulation for MIMO Channels," IEEE 19th International Symposium on Personal, Indoor and Mobile Radio Communications, Sep. 15-18, 2008, pp. 1-5.

P.H. Kuo, "SCRAD modulation: high data rate space shift keying scheme permitting reduced-complexity detector," Electronics Letters, Nov. 22, 2012, pp. 1-2.

* cited by examiner $011011 \Rightarrow (I,Q)=(3,-5)$    $101100 \Rightarrow (I,Q)=(-1,1)$ $X_I = [\ 0\ 1\ 0\ 0\ ]^T$    $X_I = [\ -1\ 0\ 0\ 0\ ]^T$
$\quad\ \downarrow\downarrow\downarrow\downarrow$    $\quad\ \downarrow\downarrow\downarrow\downarrow$
$\quad\ 1\ 3\ 5\ 7$    $\quad\ 1\ 3\ 5\ 7$
$\quad\ \downarrow\downarrow\downarrow\downarrow$    $\quad\ \downarrow\downarrow\downarrow\downarrow$
$X_Q = [\ 0\ 0\ -j\ 0\ ]^T$    $X_Q = [\ j\ 0\ 0\ 0\ ]^T$ $X = X_I + X_Q = [\ 0\ 1\ -j\ 0\ ]^T$    $X = X_I + X_Q = [(-1+j)\ 0\ 0\ 0\ ]^T$

FIG. 3B

| entries of $X_I, X_Q, X$ |
|---|
| $1 \rightarrow\ 1\ 0\ 0\ 0$ |
| $3 \rightarrow\ 1\ 1\ 0\ 0$ |
| $5 \rightarrow\ 1\ 1\ 1\ 0$ |
| $7 \rightarrow\ 1\ 1\ 1\ 1$ |

ANTENNA MODULATION METHOD APPLICABLE TO WIRELESS TRANSMITTER AND TRANSMITTER USING THE SAME

CROSS REFERENCE TO RELATED APPLICATION

This application claims the priority benefit of U.S. provisional application Ser. No. 61/844,949, filed on Jul. 11, 2013. The entirety of the above-mentioned patent application is hereby incorporated by reference herein and made a part of specification.

TECHNICAL FIELD

The present disclosure is directed to an antenna modulation method applicable to a wireless transmitter and a transmitter using the same method.

BACKGROUND

Incorporating massive antenna arrays into wireless transceivers has been discussed as one of potential techniques to increase link gains via beamforming for specifications of future cellular networks such as the Long Term Evolution (LTE) release 12 and beyond. Possibilities of utilizing massive antenna arrays are under discussions in standardization forums including the third generation partnership project (3GPP). Benefits of using massive multi input multiple output (MIMO) antenna techniques may include power savings, high beamforming gains, low interference generations, robustness of signal transmissions, and so forth. In order to achieve tremendous link gains via beamforming by using massive MIMO antenna techniques with massive antenna arrays, knowledge of very accurate channel state information (CSI) would be required by a transmitter using such technique. If the CSI were to lack accuracy, then beamforming by using lots of antennas would not be brought to its full potential.

However, acquisitions of accurate CSI to be used by a transmitter would often be impractical in various cases, such as frequency-division duplex (FDD) systems for example. On the other hand, reaching high data rates by using spatial domain modulation (SDM) with massive transmit-antenna arrays has recently drawn considerable attentions. Two examples of such SDM schemes may include Spatial Modulation (SM) and Generalized Space Shift Keying (GSSK). In both of these two SDM schemes, CSI may not be needed by transmitters operating under these SDM schemes.

For Spatial Modulation (SM), during each signaling interval, information could be carried by the combination of the antenna space of a transmitting antenna and a transmit symbol of the transmitting antenna. For example, suppose that there are four antennas with each antenna situated at a different location, the space of an antenna could be used to carry information. Since there are four antennas and only one antenna would be turned on per signaling interval, the four antennas could convey four different symbols. For each antenna, additional information could be conveyed by the digital modulation scheme. Assuming that binary phase shift keying (BPSK) is used for all four antennas, two additional symbols could be conveyed by each antenna. Therefore, 8 different symbols could be conveyed by four antennas using the BPSK modulation scheme, and the 8 different symbols could be represented by three bits. Therefore, the number of representable symbols could be increased by either increasing the number of antennas or by using a higher order modulation scheme for each antenna.

For GSSK on the other hand, data could be conveyed by the permutation of different activated antennas as a mapping table could be used to map between input bits and activated antennas.

Accordingly, the SDM schemes have the following advantages. Conveying information in spatial domains would be currently more cost-effective than conveying information in time domains or in frequency domains. By convey information in spatial domains, high data rate could be achieved by a high number of antennas operating under lower-order modulations. For instance, the aforementioned SM scheme would allow 3 bits to be transmitted using 4 transmitting antennas with a BPSK modulation symbol for each antenna. Since only one antenna could be turned on at a time, not only energy consumptions would be lowered but also the hardware cost would be reduced since the hardware of the front end transceivers could be shared by all of the antennas. Furthermore, the CSI is not needed by a transmitter as complex beamforming operations could be accomplished without requiring CSI.

However, there are still several drawbacks in SM and GSSK. If the number of antennas were to stay constant, launching symbols of a higher-order IQ-modulation on activated antennas for the purpose of boosting data rates would be undesirable in noisy channels. For GSSK, the antenna array size and the number of activated antennas have to be increased in order to increase the bit size of a symbol. For instance, in order to represent 64-QAM (6 bits) with 8 antennas, at least 4 antennas should be turned on. To represent 256-QAM (8 bits) with 16 antenna, at least 3 antennas should be turned on. Moreover, maximum-likelihood (ML) detection has been suggested as the receiver's algorithm for both SM and GSSK, the computational complexity to perform ML would be unacceptable in practice despite its optimal performance. These aforementioned challenges could become issues of focus for those who are skilled in the art.

SUMMARY OF THE DISCLOSURE

The present disclosure is directed to an antenna modulation method applicable to a wireless transmitter and a transmitter using the same method.

In one of the exemplary embodiments, the present disclosure is directed to an antenna modulation method which includes at least but not limited to receiving a symbol represented by a bit stream; converting the bit stream into a coordinate point of a signal constellation comprising a horizontal-axis component and a vertical-axis component; converting, from the horizontal-axis component of the coordinate point, a first vector having at least a first entry and a second entry, wherein the first entry and the second entry of the first vector map to at least one of a first antenna and a second antenna; converting, from the vertical-axis component of the coordinate point, a second vector having at least a third entry and a fourth entry, wherein the at least third entry and the fourth entry of the second vector map to at least one of the first antenna and the second antenna; generating a third vector having at least a fifth entry and a sixth entry by summing the first vector and the second vector, wherein the fifth entry and the sixth entry map to at least one of the first antenna and the second antenna; and activating at least one of the first antenna and the second antennas based on one or more non-zero entries of the third vector.

In one of the exemplary embodiment, the present disclosure is directed to a transmitter which includes at least but not limited to an antenna array including at least a first antenna and a second antenna, a communication unit coupled to the antenna for upconverting from a digital baseband signal to an analog radio frequency signals, and a processing unit coupled to the communication unit and is configured for: receiving a symbol represented by a bit stream; converting the bit stream into a coordinate point of a signal constellation comprising a horizontal-axis component and a vertical-axis component; converting, from the horizontal-axis component of the coordinate point, a first vector having at least a first entry and a second entry, wherein the first entry and the second entry of the first vector map to at least one of a first antenna and a second antenna; converting, from the vertical-axis component of the coordinate point, a second vector having at least a third entry and a fourth entry, wherein the at least third entry and the fourth entry of the second vector map to at least one of the first antenna and the second antenna; generating a third vector having at least a fifth entry and a sixth entry by summing the first vector and the second vector, wherein the fifth entry and the sixth entry map to at least one of the first antenna and the second antenna; and controlling the communication unit to activate at least one of the first antenna and the second antennas based on one or more non-zero entries of the third vector.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 3B illustrates an example of a first embodiment of the present disclosure by using a 64 QAM constellation diagram.

FIG. 3C illustrates an example of a second embodiment of the present disclosure by using a 64 QAM constellation diagram.

DETAILED DESCRIPTION OF DISCLOSED EMBODIMENTS

Figure 1A:
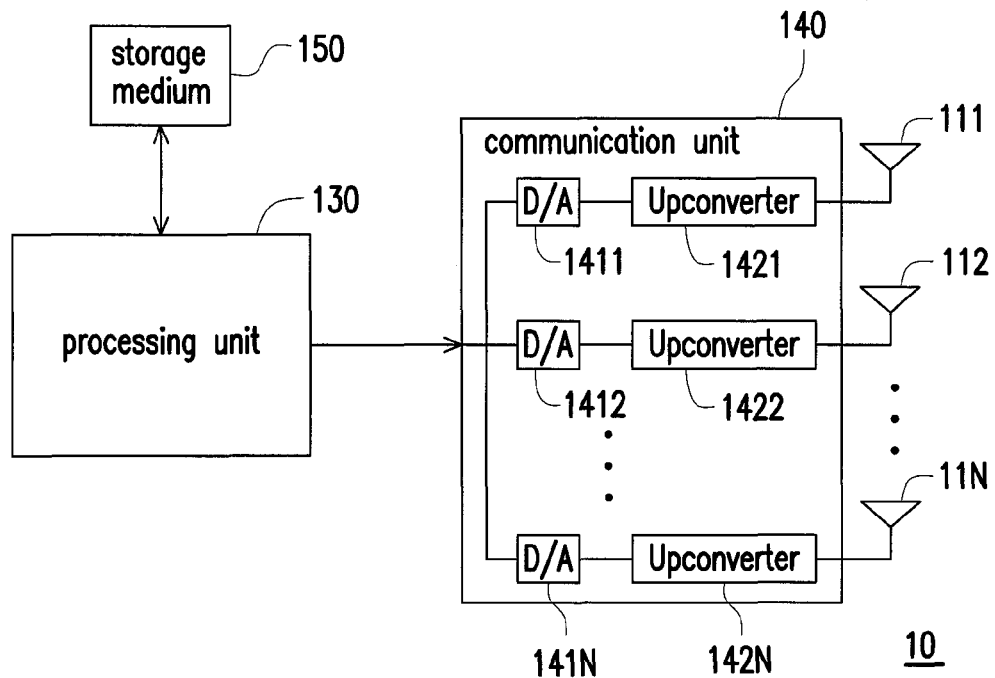
FIG. 1A illustrates a functional block diagram of an exemplary transmitter according to one of the embodiments of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1A illustrates a functional block diagram of an exemplary transmitter according to one of the embodiments of the present disclosure. Referring to FIG. 1A, the transmitter 10 may include antennas 111-11N, a communication unit 140, a processing unit 130 and a storage medium 150.

In the present disclosure, transmitter 10 could be applied into a wireless communication device, such as a control node or a user equipment (UE), the disclosure is not limited thereto. In the present disclosure, the transmitter 10 is configured for transmitting signals (e.g., analog radio frequency signals) to another wireless communication device (e.g., a wireless communication device equipped with a receiver corresponding to the transmitter 10), and receiving signals from another wireless communication device channel respectively. To achieve the above-described signal exchange, wireless communication devices may be equipped with both the a transmitter (e.g., transmitter 10 in the disclosure) and a receiver (e.g., a receiver corresponding to the transmitter 10).

In this disclosure, the transmitter 10 could be applied in a Multiple-Input Multiple-Output (MIMO) system, wherein the transmitter 10 is quipped with N antennas (antennas 111-11N), and a receiver in the MIMO system is equipped with R antennas, wherein N and R are bigger than 1. The transmitter 10 would be aimed to transmit symbols per channel use through a MIMO channel, so that the receiver could receives symbols by the R antennas.

The communication unit 140 would be coupled to the antenna 111-11N, for upconverting from a digital baseband signal (e.g., received from the processing unit 130) to an analog radio frequency signals that are ready to transmitting through at least one of the antennas 111-11N. The communication unit 140 may include a digital-to-analog (D/A) converter and an upconverter, for respectively transforming the digital baseband signal to an analog baseband signal, and then upconverting the analog baseband signal to the analog radio frequency signals. In the present embodiment, the communication unit 140 would include N D/A converter 1411-141N and N upconverter 1421-142N, and each of the D/A converter 1411-141N and the upconverter 1421-142N are respectively connected to each of the antenna 111-11N, for example, D/A converter 1411 would be connected to upconverter 1421, and the upconverter 1421 would be coupled to the antenna 111 . . . etc. and when one of the antenna 111-11N is activated (e.g., activated by the communication unit 140 via the control of processing unit 130), the D/A converter and the upconverter that corresponding to the antenna (i.e., one of the D/A converter 1411-141N and one of the upconverter 1421-142N that is coupled to the antenna) would be activated too.

The processing unit 130 would be coupled to the communication unit 140 and in the present embodiment, the processing unit 130 would be at least configured for: receiving a symbol represented by a bit stream; converting the bit stream into a coordinate point of a signal constellation comprising a horizontal-axis component and a vertical-axis component; converting, from the horizontal-axis component of the coordinate point, a first vector having at least a first entry and a second entry, wherein the first entry and the second entry of the first vector map to at least one of a first antenna and a second antenna; converting, from the vertical-axis component of the coordinate point, a second vector having at least a third entry and a fourth entry, wherein the at least third entry and the fourth entry of the second vector map to at least one of the first antenna and the second antenna; generating a third vector having at least a fifth entry and a sixth entry by summing the first vector and the second vector, wherein the fifth entry and the sixth entry map to at least one of the first antenna and the second antenna; and controlling the communication unit to activate at least one of the first antenna and the second antennas based on one or more non-zero entries of the third vector.

Figure 1B:
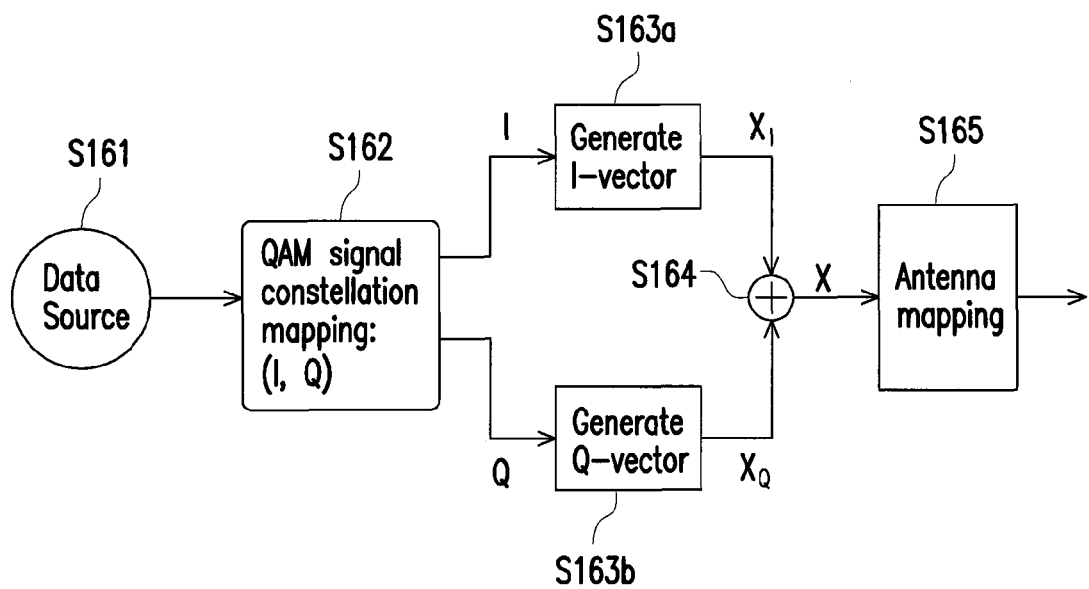
FIG. 1B illustrates a functional block diagram of a processing unit of the transmitter according to one of the embodiments of the present disclosure.

FIG. 1B illustrates a functional block diagram of a processing unit of the transmitter according to one of the embodiments of the present disclosure. The functions of the processing unit 130 in transmitter 10 may be implemented using programmable units such as a micro-processing unit, a microcontroller, a DSP chips, FPGA, etc. The functions of the processing circuit may also be implemented with separate electronic devices or ICs, and the processing circuit may also be implemented with either hardware or software.

Referring to FIG. 1B, at step S161, a symbol is received from a data source. In the present embodiment, the symbol could be one of the symbol in a data stream, and the data source could be a volatile or non-volatile memory (e.g., the storage medium 150), another functional unit in the transmitter 10, or one of the functional block (not shown) in the processing unit 130, the disclosure is not limited thereto.

Next, at step S162, the processing unit would convert the bit stream into a coordinate point of a signal constellation. Accordingly, each B-bit symbol in any data stream could be associated with a signal constellation point on a $2^B$-ary Quadrature Amplitude Modulation (QAM) constellation. As a result, in the present embodiment, the bit stream represented the symbol would include B bits; and the signal constellation would be the $2^B$-ary QAM constellation. The coordinate in $2^B$-ary QAM constellation would consist of a horizontal-axis component and a vertical-axis component that respectively represents the abscissa component and the ordinate component of the coordinate, the coordinate point of the signal constellation could be denoted as (I, Q), wherein I represents the horizontal-axis component and Q represents the vertical-axis component.

Then, at step S163a and S163b, the processing unit 130 would respectively generate a I-vector $x_I$ (i.e., the horizontal-axis component vector, or the first vector) in response to the value of the horizontal-axis component of the coordinate point (i.e., I) and generate a Q-vector (i.e., the vertical-axis component vector, or the second vector) in response to the value of the vertical-axis component of the coordinate point (i.e., Q).

Accordingly, both the value of horizontal-axis component and the vertical-axis component are taken from the set S:

$$S=\{\pm1,\pm3,\ldots,\pm Z\}, \text{ where } Z=2N-1 \quad (1)$$

All entries in set S would be odd integers, and the N entries in the I-vector $x_I$ and the Q-vector $x_Q$ are dedicated to represent the absolute value of one of the element within the set S, which would be $\{1, 3, \ldots, Z\}$. For example, in one exemplary embodiment of the present disclosure, N equals to 2 (i.e., Z=3), then the first and the second entry of the I-vector $x_I$ and the Q-vector $x_Q$ could be dedicated to represent the absolute value of 1 and 3 respectively. The entry of the I-vector $x_I$ that corresponds to the value of the I (the horizontal-axis component of the coordinate) is set to either 1 or −1 depending on the sign of I, e.g., 1 if I is positive, −1 if I is negative, while the remaining entries of I-vector $x_I$ are set to 0.

Similarly, the entry of the Q-vector $x_Q$ that corresponds to the value of Q (the vertical-axis component of the coordinate) is set to either j or −j ($j=\sqrt{-1}$, the imaginary number) depending on the sign of Q, e.g., j if Q is positive, −j if Q is negative, while the remaining entries of Q-vector $x_Q$ are set to 0. For instance, if the coordinate (I, Q) equals to (−1, 1), the I-vector $x_I$ and the Q-vector $x_Q$ would be [−1, 0] and [j, 0] respectively.

After the I-vector $x_I$ and the Q-vector $x_Q$ are generated, at step S164, the I-vector $x_I$ and the Q-vector $x_Q$, would be summed as a transmitting vector x (i.e., the third vector), wherein $x=x_I+x_Q$, which would be the signal vector to be launched into air by the array of the antennas 111-11N. Following the exemplary embodiment described above, I-vector $x_I$ and the Q-vector $x_Q$ are respectively $[-1, 0]^T$ and $[j, 0]^T$, the transmitting vector x would be equal to $[-1+j, 0]^T$. It is noted that though in the present embodiment, the summation of I-vector $x_I$ and the Q-vector $x_Q$ (i.e., step S164) is a step processed by the processing unit 130, the step S164 could also be done by the communication unit 140, the disclosure is not limited thereto.

Then, at step S165, the transmitting vector would be mapped to the at least one of the antenna 111-11N. And the processing unit 130 would controls the communication unit to activate part or all the antenna 111-11N that mapped to the one or more non-zero entries in transmitting vector x. Or, the communication unit 140 could activate part or all of the antenna 111-11N in response to the non-zero entries of the transmitting vector x, and the mapping relationship between the entries of the transmitting vector x and the antennas could also be determined by the communication unit 140.

For example, the entries in transmitting vector x would be mapped to one of the antenna 111-11N with the same index, i.e., the first entry of the transmitting vector x would be mapped to the first antenna 111, and the second entry of the transmitting vector x would be mapped to the second antenna 112, and so on. Following the example depicted above, the transmitting vector $x=[-1+j, 0]^T$, and the first entry of the transmitting vector x is mapped to the first antenna 111, and the second entry of the transmitting vector x is mapped to the second antenna 112, then the processing unit 130 would controls the communication unit 140 to activate the antenna corresponding to the non-zero entries of transmitting vector x, which would be antenna 111 corresponding to the first entry of the transmitting vector x, with the non-zero value of −1+j.

The mapping relationship between the entries of the transmitting vector x and the antennas described above is a one-to-one relationship, but the mapping relationship between the entries of the transmitting vector x and the antennas could also be a one-to-many relationship, the disclosure is not limited thereto. A mapping table could be used to describe the mapping relationship between the entries of the transmitting vector x, and the mapping table could be stored in the processing unit 130, the communication unit 140 or the storage medium 150.

Referring back to FIG. 1A, after the mapping and activating part or all the antennas 111-11N, the communication unit 140 would modulate non-zero entries of the transmitting vector into analog radio frequency signals corresponding to each of the activated antennas (e.g., modulate the first entry (1+j) into the analog radio frequency signal corresponding to the first antenna 111), and transmit the analog radio frequency signal (modulated from the transmitting vector x) with the enabled antennas (e.g., the first antenna 111).

It is noted that the communication unit 140 would modulate the transmitting vector by using a $2^M$-ary modulation scheme. Owing to the space modulation scheme described in the previous blocks (i.e., step S161-S164), the value of M would be smaller than N. For example, in the previous described exemplary embodiment, the value of the entries in the I-vector $x_I$ and the Q-vector $x_Q$ includes only ±1 and ±1, in this exemplary embodiment, the communication unit could simply modulates the transmitting vector with the Binary Phase Shift Keying (BPSK) modulation scheme (i.e., M=2), and respectively modulate entries with value of [+1, −1] as real [+BPSK, −BPSK] signals, and entries with value of [+j, −j] as imagery [+BPSK, −BPSK] signals (e.g, BPSK signals with 90 degrees of phase shift, or orthogonal to the real BPSK signals), but the disclosure is not limited thereto.

Figure 2:
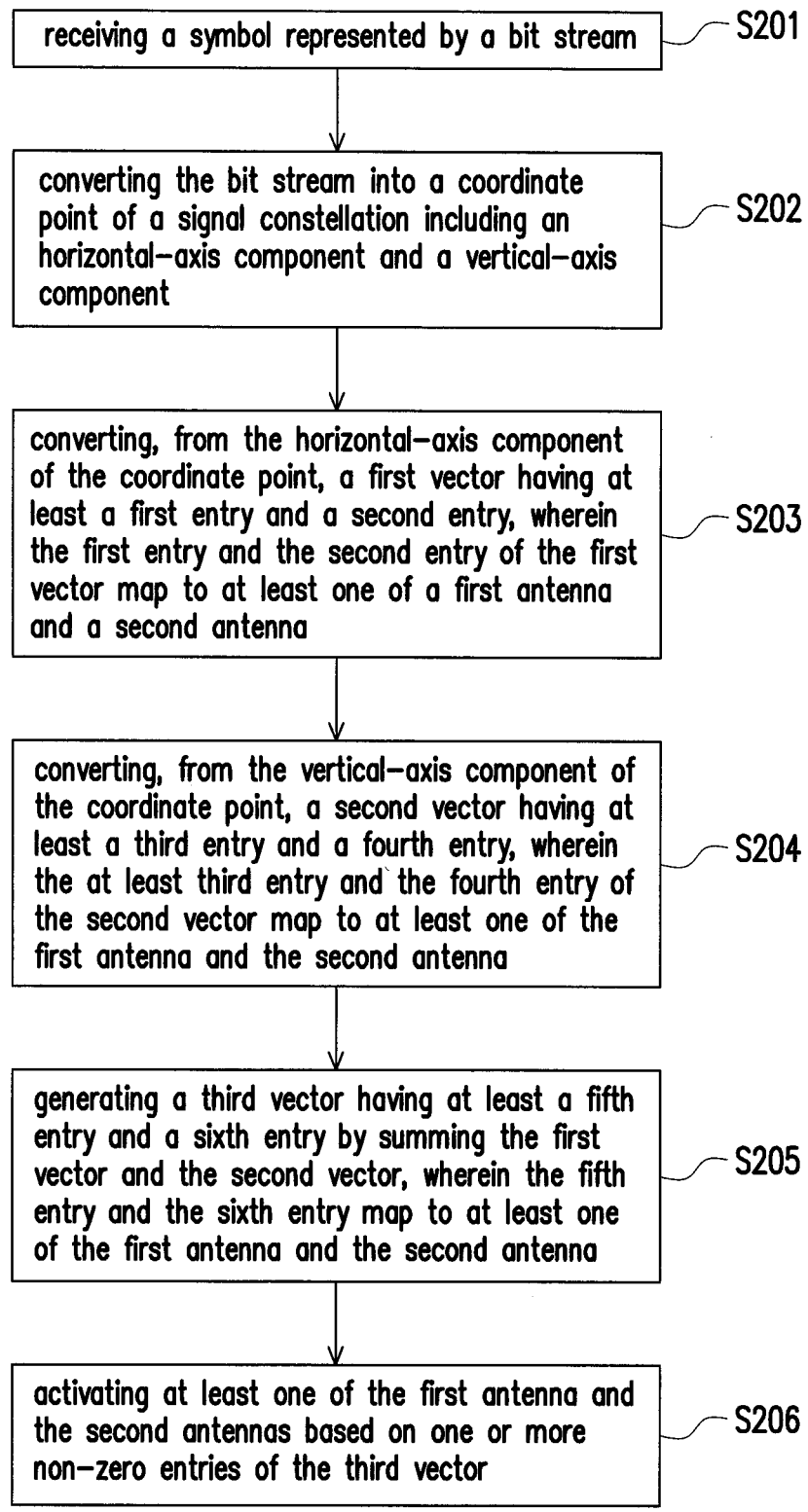
FIG. 2 illustrates a flow chart of the antenna modulation method in accordance with one of the exemplary embodiment of the present disclosure.

FIG. 2 illustrates a flow chart of the antenna modulation method in accordance with one of the exemplary embodiment of the present disclosure, wherein the antenna modulation method would be applicable to a transmitter with at least a processing unit and N antennas, like the transmitter 10 shown in FIG. 1. Referring to FIG. 2, at step S201, receiving a symbol represented by a bit stream; at step S202, converting the bit stream into a coordinate point of a signal constellation including an horizontal-axis component and a vertical-axis component; at step S203, converting, from the horizontal-axis component of the coordinate point, a first vector having at least a first entry and a second entry, wherein the first entry and the second entry of the first vector map to at least one of a first antenna and a second antenna; at step S204, converting, from the vertical-axis component of the coordinate point, a second vector having at least a third entry and a fourth entry, wherein the at least third entry and the fourth entry of the second vector map to at least one of the first antenna and the second antenna; at step S205, generating a third vector having at least a fifth entry and a sixth entry by summing the first vector and the second vector, wherein the fifth entry and the sixth entry map to at least one of the first antenna and second antenna; and at step S206, activating at least one of the first antenna and the second antennas based on one or more non-zero entries of the third vector.

Figure 3A:
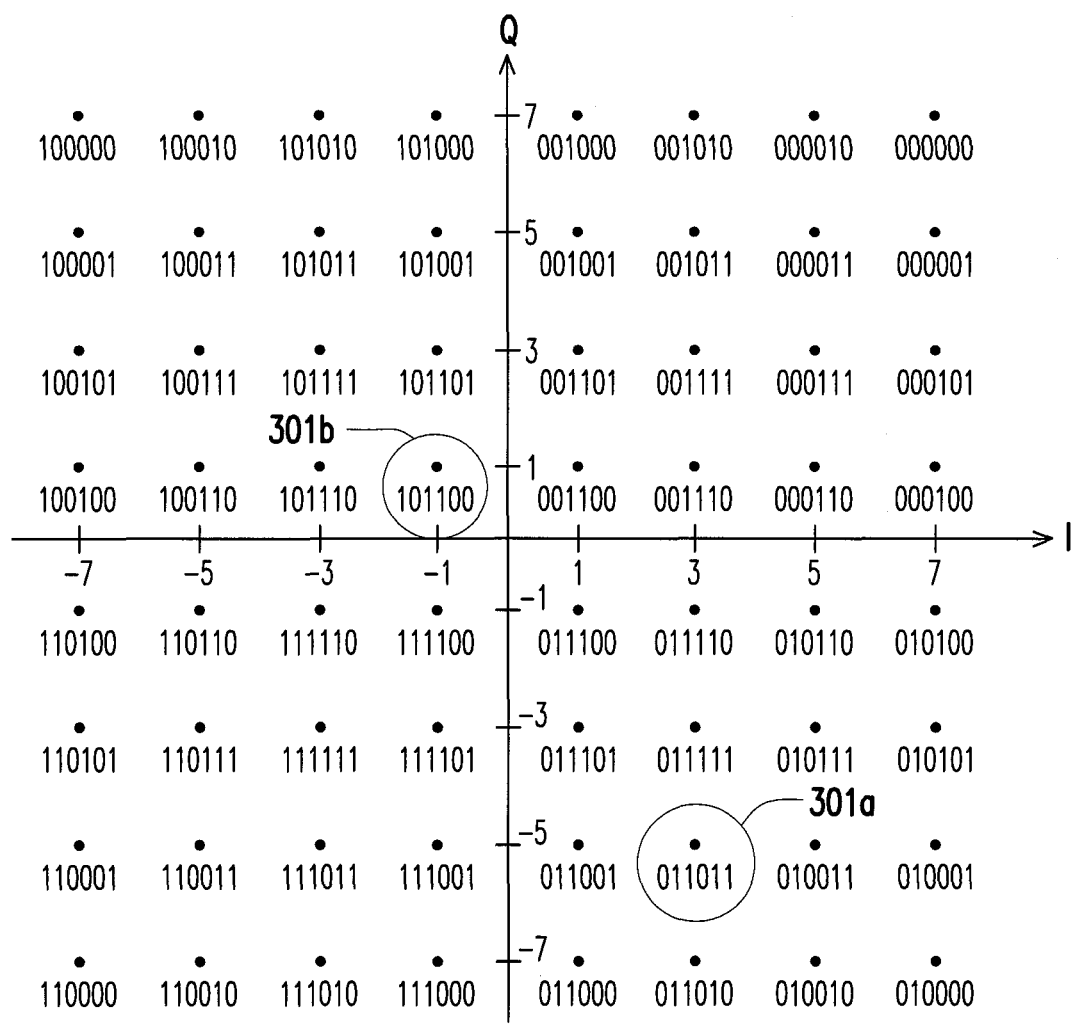
FIG. 3A illustrates a schematic diagram of a 64 QAM constellation diagram.

An example of converting a symbol into a transmitting vector would be described herein. In the following example, the symbol size (length of the bit stream) B would equal to 6 and the number of antenna N equals to 4 are considered. FIG. 3A illustrates a schematic diagram of a 64 QAM constellation diagram, and FIG. 3B illustrates an example of a first embodiment of the present disclosure by using a 64 QAM constellation diagram.

Referring to FIGS. 3A and 3B, assuming that a symbol '011011' is received by the processing unit 130, and by FIG. 3, the processing unit 130 could map a symbol '011011' with a coordinate 301a which the horizontal-axis component and the vertical-axis component (I, Q) equals to (3, −5). Also, in the first embodiment of the present disclosure, the one-to-one relationship between the entries of the transmitting vector x and the antennas is used. That is, the entries in the I-vector $x_I$ and the Q-vector $x_Q$ could be used to represent {1, 3, 5, 7} sequentially, so the I-vector $x_I$ and the Q-vector $x_Q$ could be generated as:

$$x_I = [0\ 1\ 0\ 0]^T \quad (2)$$

$$x_Q = [0\ 0\ -j\ 0]^T \quad (3)$$

And the transmitting vector x could be derived by summing the I-vector $x_I$ and the Q-vector $x_Q$:

$$x = [0\ 1\ -j\ 0]^T \quad (4)$$

As a result of (4), a positive real BPSK signal (+1) and a negative imagery BPSK signal (−j) are to be transmitted though the second antenna 112 and the third antenna respectively, while the first antenna 111 and the fourth antenna 114 are both disabled.

Further, when a symbol '101100' is received by the processing unit 130. the processing unit 130 would map the symbol as the coordinate 301b which (I, Q)=(−1, 1), results in transmitting vector $x=[(-1+j)\ 0\ 0\ 0]^T$ that disabled 3 out of 4 antennas, and only the first antenna 111 remains enabled with transmitting signal corresponding to (−1+j).

It is noted that in the above-described example and the previous described exemplary embodiments, the corresponding relationship between the value of (I, Q) and the entries in transmitting vector x (also the I-vector $x_I$, the Q-vector $x_Q$) are one-to-one relationship, but the value of (I, Q) could also be represented by different combinations of n non-zero entries of I-vector $x_I$, the Q-vector $x_Q$ respectively, so as to increase the data rate, wherein n is a positive integer between 0 and N. That is, n out of N entries of the I-vector $x_I$, are set to +1 or −1, and the remaining N-n entries of the I-vector $x_I$ are set to 0. Analogously, n out of N entries of the Q-vector $x_Q$ are set to +1 or −1, and the remaining N-n entries of the Q-vector $x_Q$ are set to 0. The achievable data rate could be derived as:

$$B = 2 + \left\lfloor 2\log_2 \frac{N!}{n!(N-n)!} \right\rfloor \quad (5)$$

FIG. 3C illustrates an example of a second embodiment of the present disclosure by using a 64 QAM constellation diagram. In the second embodiment, the one-to-many relationship between the value of (I,Q), the entries of the transmitting vector x and the antennas would be described. Here in the second embodiment, the corresponding relationship of the value of (I, Q) and entries of I-vector $x_I$, the Q-vector $x_Q$ and the transmitting vector x is shown in the FIG. 3C, such that it would be like using the each of the entries as binary bits to represent the value of (I, Q). As a result, with the same value of (I, Q)=(3, −5), I-vector $x_I$, would be converted as $[1\ 1\ 0\ 0]^T$, then the Q-vector $x_Q$ would be converted as $[-j\ -j\ -j\ 0]^T$, and the transmitting vector x would become $[(1-j)\ (1-j)-j\ 0]^T$, so an analog radio frequency signal mixed with positive real BPSK signal and negative imagery BPSK signal would be transmitted through antenna 111 and 112, an negative imagery BPSK signal would be transmitted through the antenna 113 while the antenna 114 is disabled.

It is noted that the one-to-many corresponding relationship shown in FIG. 3C is between the values of (I, Q) and the entries of I-vector $x_I$, the Q-vector $x_Q$ and the transmitting vector x, the one-to-many corresponding relationship could also be set between the transmitting vector x and the corresponding antenna(s), e.g., when first entry of the transmitting vector x is a non-zero entries, activating not only the first antenna 111 but also the second antenna 112 transmitting the same signal corresponding to the value of the first entry of the transmitting vector, but the disclosure is not limited thereto.

Figure 4:
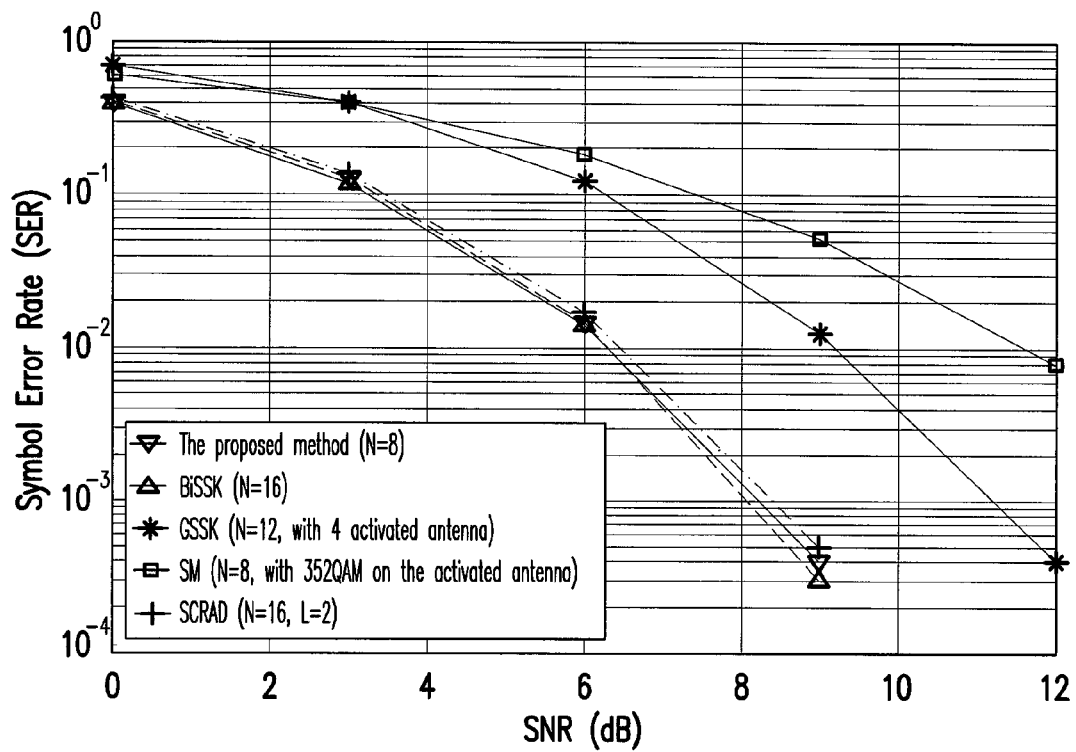
FIG. 4 is an experimental result showing the symbol error rate with respect to the signal to noise ratio by using the first embodiment of the present disclosure.
Figure 5:
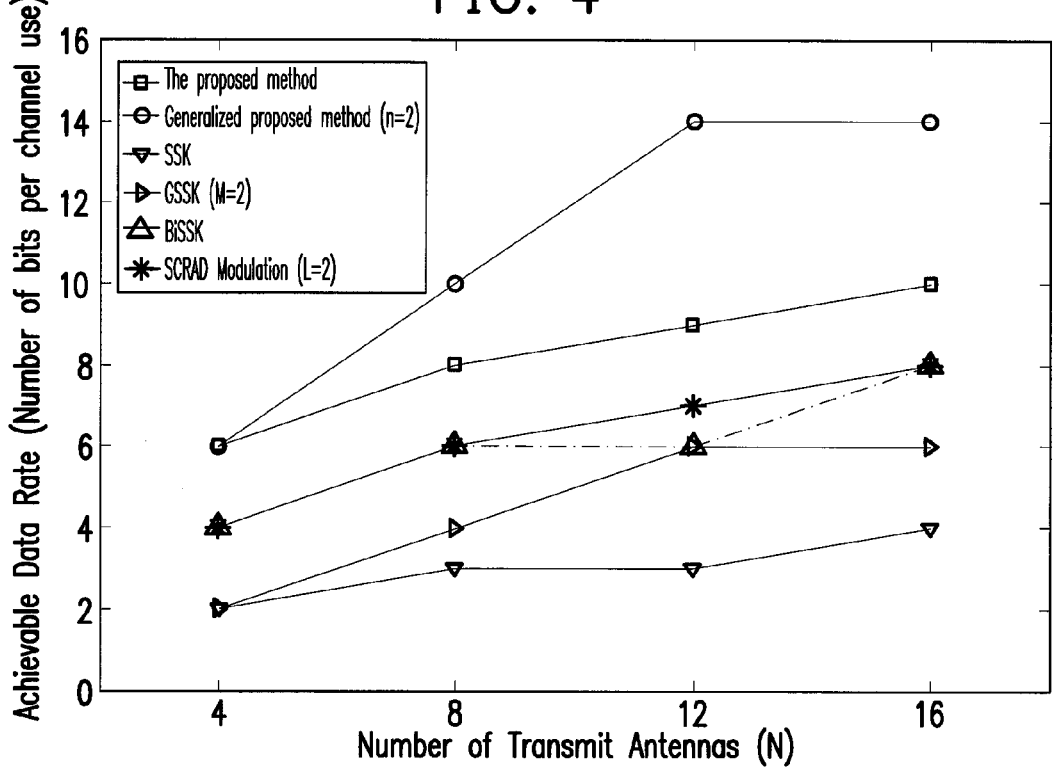
FIG. 5 illustrates is an experimental result showing the symbol error rate with respect to the signal to noise ratio by using the second embodiment of the present disclosure.

FIG. 4 is an experimental result showing the symbol error rate with respect to the signal to noise ratio by using the first embodiment of the present disclosure. In the experiment, N=8 (e.g., 8 antennas) is assumed. Referring to FIG. 4, it could be understood that by using the data modulation method proposed in the present disclosure, same symbol error rate could be achieved while applied fewer antennas than the conventional arts such as BiSSK (with N=16) and SCRAD (with N=16, L=2), and the said symbol error rate would also be better than conventional skills like GSSK (N=12, with 4 activated antennas) and SM (N=8, with 32 QAM on the activated antenna). FIG. 5 illustrates is an experimental result showing the symbol error rate with respect to the signal to noise ratio by using the second embodiment of the present disclosure. Referring to FIG. 5, by utilizing the one-to-many corresponding relationship between the value of (I, Q) (or the entries of transmitting vector x) and the activated antennas, the achievable data rate of the proposed data modulation method (also the generalized version of the proposed data modulation method that sets n=2) is greatly improved.

In view of the aforementioned descriptions, the present disclosure can be assimilated in a wireless communication system having transmitters which would be able to accomplish complex beamforming operations with requiring accurate CSI and thus measurements and feedbacks would not be required. The resources levied on the time and frequency domains could be alleviated by shifting the resources to the spatial domain. Also, transmission power could be reduced in comparison to conventional MIMO technologies as some antennas do not need to be activated.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. An data modulation method applicable to a transmitter comprising a plurality of antennas and a processing unit which is configured to execute functions comprising:
   receiving a data segment represented by a bit stream;
   converting the bit stream into a multi-dimensional coordinate comprising a first dimension and a second dimension;
   generating a first vector having a plurality of first elements according to the first dimension of the multi-dimensional coordinate, wherein the number of the first elements and the number of the antennas are identical, the first elements comprises at least a first entry and a second entry, and at least one of the first entry and the second entry of the first vector is set to a first non-zero entry;
   generating a second vector having a plurality of second elements according to the second dimension of the multi-dimensional coordinate, wherein the number of the second elements and the number of the antennas are identical, the second elements comprises at least a third entry and a forth entry, and at least one of the third entry and the forth entry of the second vector is set to a second non-zero entry, wherein absolute phase difference between the first non-zero entry and the second non-zero entry is greater than 0 degree;
   generating a third vector having a plurality of third elements by summing the first vector and the second vector, wherein the number of the third elements and the number of the antennas are identical, the third elements comprises at least a fifth entry and a sixth entry, the fifth entry of the third vector map to the first antenna among the antennas, and the sixth entry of the third vector map to the second antenna among the antennas; and
   activating at least one of the first antenna and the second antennas and emitting waveforms according to one or more non-zero entries of the third vector for transmitting the data segment during one signalling interval.

2. The method of claim 1, wherein:
   the bit stream comprises B bits; and
   a signal constellation of the multi-dimensional coordinate is the $2^B$-ary Quadrature Amplitude Modulation (QAM) constellation.

3. The method of claim 1, wherein the step of generating the first vector having the first elements according to the first dimension of the multi-dimensional coordinate comprising:
   setting at least one of the first entry and second entry to 1 in response to the value of the first dimension of the multi-dimensional coordinate.

4. The method of claim 1, wherein the step of generating the second vector having the second elements according to the second dimension of the multi-dimensional coordinate comprising:
   setting at least one of the third entry and the fourth entry to j in response to the second dimension of the multi-dimensional coordinate, wherein j is the imaginary number.

5. The method of claim 1, wherein activating the at least one of the first antenna and the second antennas and emitting waveforms according to the one or more non-zero entries of the third vector for transmitting the data segment during one signalling interval comprising:
   when the fifth entry of the third vector is a non-zero entry, activating at least one of the first antenna and the second antennas corresponding the fifth entry; and
   when the sixth entry of the third vector is a non-zero entry, activating at least one of the first antenna and the second antennas corresponding the sixth entry.

6. The method of claim 1, wherein after the step of activating the at least one of the first antenna and the second antennas and emitting waveforms according to the one or more non-zero entries of the third vector for transmitting the data segment during one signalling interval, the method further comprising:
   transmitting at least one analog radio frequency signal by the activated antenna based on the one or more non-zero entries of the third vector, wherein when one of the non-zero entries comprising real value, the analog radio frequency signal corresponding to the non-zero entry comprising a first Binary Phase Shift Keying (BPSK) signal, and when one of the non-zero entries comprising imaginary value, the analog radio frequency signal corresponding to the non-zero entry comprising a second BPSK signal, wherein the first BPSK signal is orthogonal to the second BPSK signal.

7. The method of claim 5, wherein each of the first entry of the first vector, the third entry of the second vector, and the fifth entry of the third vector corresponds to only the first antenna.

8. The method of claim 5, wherein each of the second entry of the first vector, fourth of the second vector and the sixth entry of the third vector corresponds to only the second antenna.

9. The method of claim 5, wherein each of the first entry of the first vector, the third entry of the second vector, and the fifth entry of the third vector corresponds to at least both the first antenna and the second antenna.

10. The method of claim 5, wherein each of the second entry of the first vector, fourth of the second vector and the sixth entry of the third vector corresponds to at least both the first antenna and the second antenna.

11. A transmitter comprising:
an antenna array comprising a first antenna and a second antenna among a plurality of antennas;
a communication unit coupled to the antenna array for converting from a digital baseband signal to an analog radio frequency signal; and
a processing unit coupled to the communication unit and is configured for:
receiving a data segment represented by a bit stream;
converting the bit stream into a multi-dimensional coordinate comprising a first dimension and a second dimension;
generating a first vector having a plurality of first elements according to the first dimension of the multi-dimensional coordinate, wherein the number of the first elements and the number of the antennas are identical, the first elements comprises at least a first entry and a second entry, and at least one of the first entry and the second entry of the first vector is set to a first non-zero entry;
generating a second vector having a plurality of second elements according to the second dimension of the multi-dimensional coordinate, wherein the number of the second elements and the number of the antennas are identical, the second elements comprises at least a third entry and a forth entry, and at least one of the third entry and the forth entry of the second vector is set to a second non-zero entry, wherein the absolute phase difference between the first non-zero entry and the second non-zero entry is greater than 0 degree;
generating a third vector having a plurality of third elements by summing the first vector and the second vector, wherein the number of the third elements and the number of the antennas are identical, the third elements comprises at least a fifth entry and a sixth entry, the fifth entry of the third vector map to the first antenna among the antennas, and the sixth entry of the third vector map to the second antenna among the antennas; and controlling the communication unit to activate at least one of the first antenna and the second antennas and emitting waveforms according to one or more non-zero entries of the third vector for transmitting the data segment during one signalling interval.

12. The transmitter of claim 11, wherein:
the bit stream comprises B bits; and
a signal constellation of the multi-dimensional coordinate is the $2^B$-ary Quadrature Amplitude Modulation (QAM) constellation.

13. The transmitter of claim 11, wherein:
the processing unit sets at least one of the first entry and second entry to 1 in response to the value of first dimension of the multi-dimensional coordinate.

14. The transmitter of claim 11, wherein:
the processing unit sets at least one of the third entry and the fourth entry to j in response to the second dimension of the multi-dimensional coordinate, wherein j is the imaginary number.

15. The transmitter of claim 11, wherein:
when the fifth entry of the third vector is a non-zero entry, the processing unit controls the communication unit to activate at least one of the first antenna and the second antennas corresponding the fifth entry; and
when the sixth entry of the third vector is a non-zero entry, the processing unit controls the communication unit to activate at least one of the first antenna and the second antennas corresponding the sixth entry.

16. The transmitter of claim 11, wherein:
the communication unit transmits at least one analog radio frequency signal by the activated antenna based on the one or more non-zero entries of the third vector, wherein when one of the non-zero entries comprising real value, the analog radio frequency signal corresponding to the non-zero entry comprising a first Binary Phase Shift Keying (BPSK) signal, and when one of the non-zero entries comprising imaginary value, the analog radio frequency signal corresponding to the non-zero entry comprising a second BPSK signal, wherein the first BPSK signal is orthogonal to the second BPSK signal.

17. The transmitter of claim 15, wherein:
each of the first entry of the first vector, the third entry of the second vector, and the fifth entry of the third vector corresponds to only the first antenna.

18. The transmitter of claim 15, wherein:
each of the second entry of the first vector, fourth of the second vector and the sixth entry of the third vector corresponds to only the second antenna.

19. The transmitter of claim 15, wherein:
each of the first entry of the first vector, the third entry of the second vector, and the fifth entry of the third vector corresponds to at least both the first antenna and the second antenna.

20. The transmitter of claim 15, wherein:
each of the second entry of the first vector, fourth of the second vector and the sixth entry of the third vector corresponds to at least both the first antenna and the second antenna.

* * * * *